United States Patent
Hingst

(10) Patent No.: US 6,895,900 B2
(45) Date of Patent: May 24, 2005

(54) ANIMAL CHEW TOY

(75) Inventor: Gary Hingst, Richmond, VA (US)

(73) Assignee: Salix LLC, Delray Beach, FL (US)

( * ) Notice: Subject to any disclaimer, the term of this patent is extended or adjusted under 35 U.S.C. 154(b) by 7 days.

(21) Appl. No.: 10/471,389

(22) PCT Filed: Jul. 28, 2003

(86) PCT No.: PCT/US03/23576

§ 371 (c)(1),
(2), (4) Date: Sep. 9, 2003

(65) Prior Publication Data

US 2005/0039697 A1 Feb. 24, 2005

Related U.S. Application Data

(60) Provisional application No. 60/319,852, filed on Jan. 10, 2003.

(51) Int. Cl.[7] .............................................. A01K 29/00
(52) U.S. Cl. .................................................... 119/710
(58) Field of Search ............................. 119/709, 710, 119/711

(56) References Cited

U.S. PATENT DOCUMENTS

| | | | |
|---|---|---|---|
| 2,988,045 A | | 6/1961 | Fisher |
| 5,673,653 A | | 10/1997 | Sherrill |
| 6,223,693 B1 | | 5/2001 | Perlberg et al. |
| 6,228,402 B1 | | 5/2001 | Wolf et al. |
| D476,118 S | | 6/2003 | Kirch |
| D477,695 S | | 7/2003 | Kirch |
| 6,584,938 B2 | * | 7/2003 | Sherrill et al. ............... 119/710 |
| D479,369 S | | 9/2003 | Kirch |
| 6,799,536 B1 | * | 10/2004 | Jia et al. ...................... 119/710 |
| 2002/0142079 A1 | * | 10/2002 | Chong ......................... 426/315 |
| 2003/0106500 A1 | * | 6/2003 | Kirch .......................... 119/710 |

* cited by examiner

*Primary Examiner*—Robert P. Swiatek
(74) *Attorney, Agent, or Firm*—McGarry Bair, PC

(57) ABSTRACT

A chew toy for a carnivorous domestic animal comprises a combination of rawhide and pigskin formed into a suitable shape, such as a bone, roll, donut, or various other shapes. The rawhide and pigskin are provided as sheets which are rolled or otherwise sandwiched together or otherwise intertwined to form a chew toy having improved flavor and order, thereby encouraging the animal to chew on the toy.

28 Claims, 3 Drawing Sheets

ANIMAL CHEW TOY

CROSS REFERENCE TO RELATED APPLICATIONS

This application claims the benefit of U.S. Provisional Application No. 60/319,852, filed Jan. 10, 2003.

BACKGROUND OF THE INVENTION

1. Field of the Invention

The invention relates to chew toys for domestic animals. In one aspect, the invention relates to a chew toy for dogs comprising a combination of rawhide and pigskin.

2. Description of the Related Art

Chew toys are well known for carnivorous domestic animals, such as dogs, who have an instinctive need to chew. Such toys frequently comprise rawhide formed into the shape of a bone or other shapes. The rawhide provides some degree of flavor and a texture that is appealing to the animal, thereby encouraging the animal to use the chew toy. The rawhide also provides a cleaning function to the animal's teeth and is thus desirable for the hygiene of the dog's teeth. An example of such a chew toy is disclosed in U.S. Pat. No. 2,988,045 to Fisher.

U.S. Pat. No. 5,673,653 to Sherrill, issued Oct. 7, 1997, discloses a combination of rawhide and jerky formed into a bone-shaped chew toy. The jerky comprises meat flavored with spices or marinade and smoked or otherwise dried, which improves the flavor and odor of the chew toy over the rawhide alone. However, meat is expensive, and the use of jerky made of meat adds significant cost and calories to the chew toy. In addition, jerky has fat calories that add to a dog's weight problems. The bone shaped chew toy can be used as a treat for a dog, thus addicting the dog to weight producing products. Furthermore, preparation of the jerky requires additional manufacturing steps, adding further cost to the chew toy. Moreover, jerky is substantially softer and less fibrous than rawhide and more readily consumed, thereby shortening the effective life of the chew toy.

SUMMARY OF THE INVENTION

A chew toy or chew resistant article for a carnivorous domestic animal comprises a combination of rawhide and pigskin (also known as pork rind) pieces interlayered together. The composite combination of rawhide and pigskin is preferable formed, for example by rolling, into a suitable shape, such as a cylindrical article. The rawhide and pigskin pieces are preferably in the form of sheets that are rolled or otherwise sandwiched or intertwined together to form a chew toy having improved flavor and odor, thereby encouraging the animal to chew on the article.

The rawhide-based chew article has improved flavor and odor and utilizes a flavor enhancer comprising an inexpensive material which is less costly to manufacture and has a longer useful life than previous chew articles. The pigskin is a tough, fibrous material that resists chewing like rawhide and thus does not materially change the longevity of the rawhide product. Further, the pigskin has little or no nutritional value although it has a considerable amount of flavor that encourages the dog to chew on the rawhide and thus improve the dental hygiene of the animal without adding weight calories to the animal. Kennel tests on pork skin/rawhide product show a canine acceptance rate is 7–8 on a scale of 10. The pigskin tends to be thinner than rawhide but far more palatable due to taste of the pigskin. Dogs seem to like the pork rind taste. On the other hand, pure rawhide is considerably less palatable to dogs due to the lack of any significant and enduring taste.

The pigskin and rawhide sheets can form a variety of shapes and can be substantially coextensive with each other in at least one dimension. Typically, the sheets or pieces are wrapped into a substantially cylindrical shape, for example to simulate a bone. In one embodiment, the cylindrical shape is knotted at the ends thereof. It is contemplated that the rawhide sheet will forms an outer layer in the cylindrical or other shape but the pigskin sheet can also form the outer layer in the cylindrical or other shape.

In those instances where the rawhide sheet or piece is the outer layer, the pigskin is exposed at a longitudinal seam of the rawhide sheet to attract the animal. The pigskin can be continuous or intermittent along the longitudinal seam of the rawhide sheet. In the latter case, there are multiple pigskin sheets or pieces that are in the form of elongated strips that are laterally spaced from each other between portions of the rawhide sheet. In the former embodiment, the pigskin sheet can be substantially coextensive with the rawhide sheet in two mutually perpendicular directions or, alternatively, there can be multiple pigskin sheets that are in the form of elongated strips that are adjacent to or laterally spaced from each other between portions of the rawhide sheet and the longitudinal direction of the pigskin sheets is parallel to the longitudinal seam of the rawhide. is intermittently exposed along the longitudinal seam of the rawhide.

The invention typically will be formed of single layers of pigskin and rawhide but the invention contemplates multiple layers of each or either material. The article or toy according to the invention desirably is made solely of the pigskin and rawhide materials but the invention contemplates that other flavor enhancing materials or other chew resistant materials can be incorporated into the article.

DESCRIPTION OF THE PREFERRED EMBODIMENT

Figure 1:
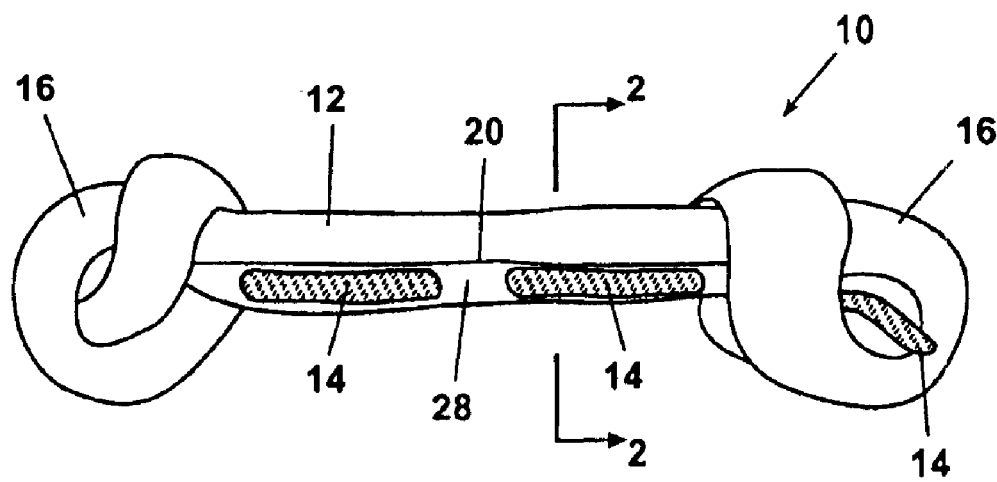
FIG. 1 is a front elevation view of a first embodiment of a chew toy according to the invention.
Figure 2:
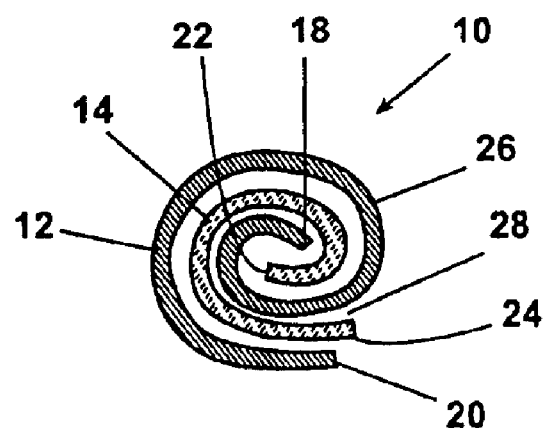
FIG. 2 is a cross-sectional view of the chew toy shown in FIG. 1 taken along line 2—2.

Referring now to the figures, and in particular to FIGS. 1 and 2, a first embodiment of a chew toy 10 comprises an outer rawhide sheet 12 and one or more inner pigskin sheets 14 interlayered and formed into the shape of a bone having ends 16. The rawhide sheet 12 is a thin, sheet-like body of processed rawhide having an interior edge 18 and an exterior edge 20. The pigskin sheet 14 is a thin, sheet-like body of processed pigskin having an interior edge 22 and an exterior edge 24.

The rawhide sheet 12 and the pigskin sheet 14 are sandwiched together and rolled into a tube-like member in a manner well-known in the art so that the rawhide sheet 12 forms an outer layer 26 which envelops the pigskin sheet 14.

Preferably, the interior edges 18, 22 are brought together in cooperative juxtaposition and the exterior edges 20, 24 are brought together in cooperative juxtaposition so that the sheets 12, 14 are in laminated communication. As shown in FIG. 1, after rolling the sheets 12, 14 into the tube-like member, the ends 16 are knotted to form a chew toy 10 closely resembling a bone.

Preferably, the exterior edge 24 of the pigskin sheet 14 extends through a seam 28 formed between the outer layer 26 and the adjacent inner layer of the rawhide sheet 12 by the rolling of the rawhide sheet 12 and the pigskin sheet 14 so that the exterior edge 24 will be exposed for an animal to smell and taste. FIG. 1 illustrates an embodiment comprising a plurality of narrow pigskin sheets 14. Alternatively, a single pigskin sheet 14 can be used having a width approximately equal to the width of the rawhide sheet 12, extending across the full width of the seam 28, and interlayered with the rawhide sheet 12 as described generally above.

As the chew toy 10 is consumed, the pigskin sheet 14 will be continuously exposed for the animal to smell and taste, thereby encouraging the animal to chew. For example, as shown in FIG. 2, the exterior edge 24 of the pigskin sheet 14 is exposed near the exterior edge 20 of the rawhide sheet 12, and another portion of the pigskin sheet 14 is located immediately beneath the outer layer 26 of the rawhide sheet 12. As the animal continues to chew for extended periods of time, the rawhide sheet 12 slowly disintegrates and is consumed by the animal with portions of the pigskin sheet 14 immediately thereunder. As layers of rawhide 12 and pigskin 14 are consumed, the chew toy 10 continues to provide an attractive flavor and odor as pigskin 14 becomes exposed. In a further embodiment, the pigskin sheet 14 can be positioned relative to the rawhide sheet 12 so that a short length, e.g. ½ to 1 inch, of the pigskin 14 projects out of the seam 28, thereby providing an immediate attraction to the animal.

Figure 3:
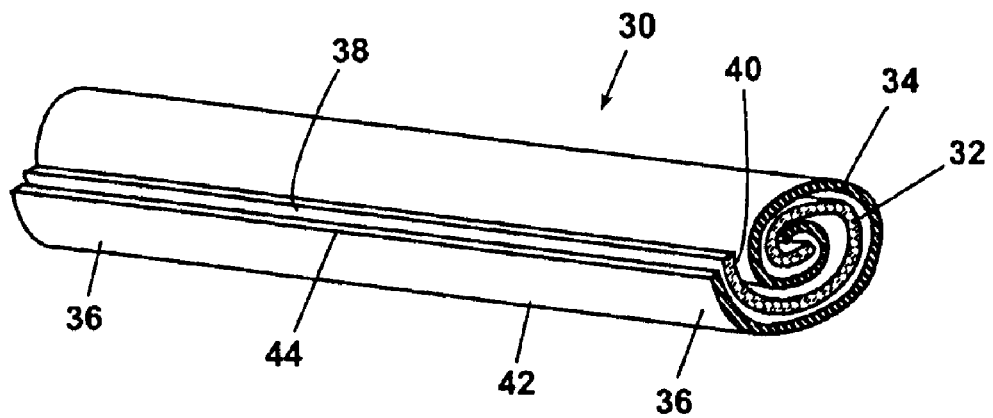
FIG. 3 is a perspective view of a second embodiment of a chew toy according to the invention.

A second embodiment of a chew toy 30 is shown in FIG. 3. The chew toy 30 is similar to the chew toy 10 in that one or more sheets of pigskin 32 are rolled with a sheet of rawhide 34. However, unlike the knotted ends 16 of the chew toy 10, the chew toy 30 has unknotted ends 36. In a further embodiment, the pigskin sheet 32 can be positioned relative to the rawhide sheet 34 so that a short length along an exterior edge 38, e.g. ½ to 1 inch, of the pigskin 32 projects out of a seam 40 formed adjacent an outer edge 44 between an outer layer 42 and an adjacent inner layer of the rawhide sheet 34 by the rolling of the rawhide sheet 34 and the pigskin sheet 32.

Figure 4:
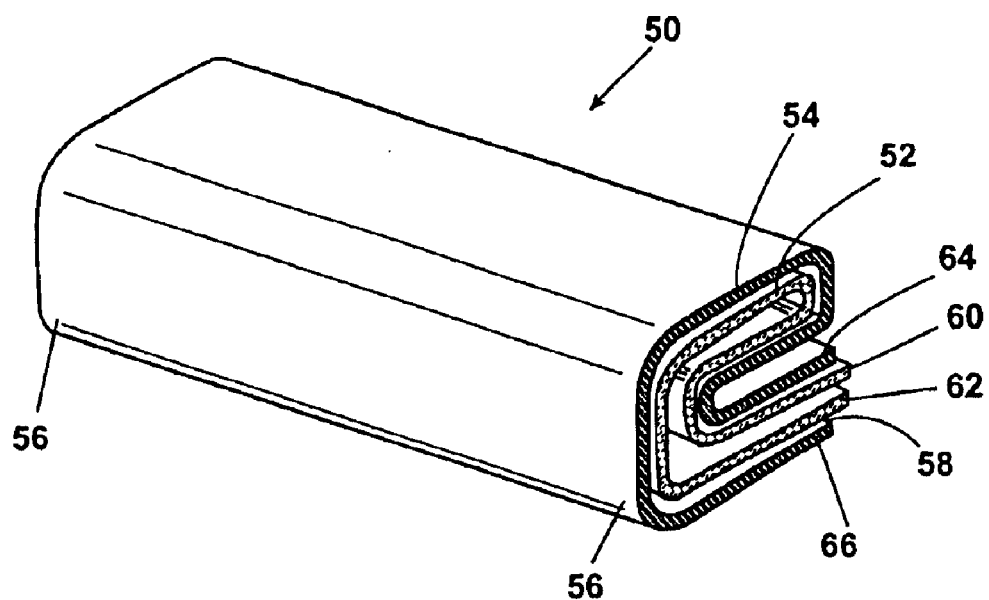
FIG. 4 is a perspective view of a third embodiment of a chew toy according to the invention.

A third embodiment of a chew toy 50 is shown in FIG. 4. In this embodiment, a pigskin sheet 52 and a rawhide sheet 54 are first folded in half before being wrapped or rolled into the chew toy 50, thereby providing a double layer of pigskin 52 and rawhide 54 in the interior of the chew toy 50. An interior edge 60 and an exterior edge 62 of the pigskin 52 are brought together in layered communication to form a double-layered sheet. An interior edge 64 of the rawhide sheet 54 is brought into layered communication with the interior edge 60, and an exterior edge 66 of the rawhide sheet 54 is brought into layered communication with the exterior edge 62 by wrapping the rawhide sheet 54 around the pigskin sheet 52. As shown in FIG. 4, the pigskin sheet 52 and the rawhide sheet 54 are formed into the chew toy 50 by folding the sheets 52, 54 one or more times upon themselves. The chew toy 50 shown in FIG. 4, is shown with unknotted ends 56. However, the ends can be knotted as with the first embodiment 10.

As with the previously-described embodiments, the pigskin sheet 52 can be positioned relative to the rawhide sheet 54 so that a short length, e.g. ½ to 1 inch, along the edges 60, 62 extends through a seam 58 formed adjacent the exterior edge 66 between the rawhide sheet 54 and an adjacent inner layer of the pigskin sheet 52. The chew toy 50 can be formed by folding the layers 52, 54 to provide a pre-selected number of folds and layers greater than that shown in FIG. 4.

Figure 5:
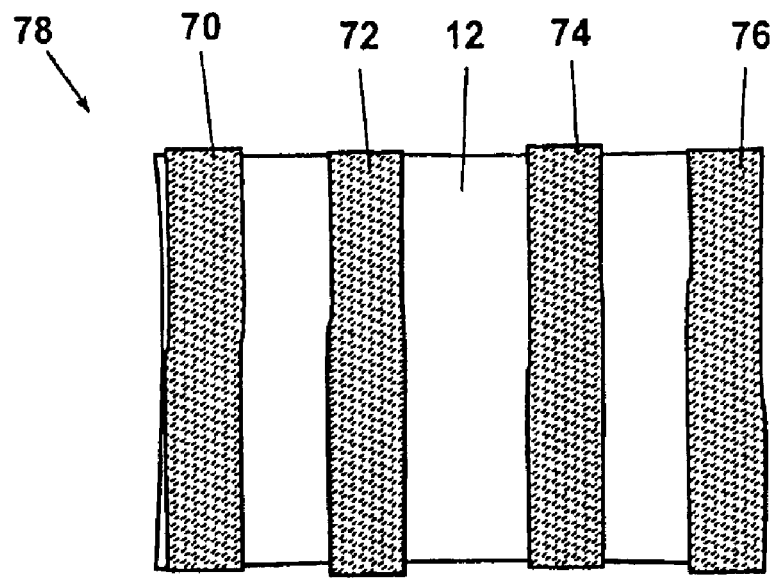
FIG. 5 is a top plan view of the chew toy shown in FIG. 1 at an intermediate stage of fabrication.

The previously described chew toys 10, 30, 50 are preferably formed by folding or rolling one or more pigskin sheets in a rawhide sheet. A single sheet of pigskin can be used which is substantially the same size as the rawhide sheet. Alternatively, a plurality of spaced-apart pigskin strips can be used. For example, the chew toy 10 of FIG. 1 is formed by arranging a plurality of pigskin strips 70, 72, 74, 76 over a sheet of rawhide 12 as shown in FIG. 5. The rawhide sheet 12 and the pigskin strips 70–76 can then be rolled in a direction parallel to the longitudinal axes of the pigskin strips 70–76. This creates longitudinally-separated exposed sections of pigskin 14 as shown in FIG. 1. Alternatively, the pigskin strips may be placed immediately adjacent to one another to form a longitudinally-continuous exposed section of pigskin similar to a single sheet of pigskin as depicted in the chew toy 30 of FIG. 3.

Figure 6:
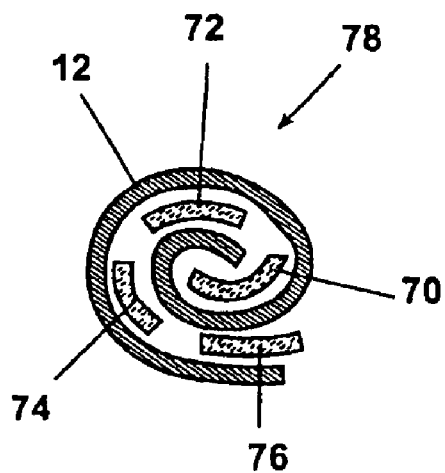
FIG. 6 is a cross-sectional view similar to FIG. 2 of a fourth embodiment of a chew toy according to the invention.

In an alternative embodiment, the pigskin strips 70–76 can be wrapped in the rawhide 12 in a direction orthogonal to the longitudinal axes of the strips 70–76 to form a chew toy 78 substantially as shown in FIG. 6. It will also be evident that different sizes and orientations of pigskin can be wrapped within the rawhide sheet to form a chew toy having different distribution and exposure patterns within the chew toy. Furthermore, the chew toy can be fabricated in a shape other than a bone, and the rawhide sheet can be wrapped around pieces of pigskin that are not in sheet form, such as rods, cylinders, spheres, or irregular shapes, particularly if such pigskin shapes are conducive to the fabrication of chew toys having different shapes. Finally, the relative positioning of the rawhide and the pigskin can be reversed from that previously described. For example, in FIGS. 1 and 2, the pigskin sheet 14 can occupy the outer layer 26 with the rawhide sheet 12 rolled within the pigskin sheet 14. In such an embodiment, the numeral 12 refers to the pigskin sheet and the numeral 14 refers to the rawhide sheet. Each of the other embodiments 30, 50 can incorporate a similar transposition of the pigskin sheet and the rawhide sheet.

To manufacture the chew toys 10, 30, 50, 78, of the present invention, rawhide is cut into generally rectilinear sheets having a predetermined size depending upon the desired length and thickness of the chew toy. For example, the length of the rawhide sheet 12 for the chew toy 10 is equal to the nominal length of the rolled center portion of the chew toy 10 plus an additional length sufficient to tie a knot at both ends 16. Additionally, the width of the rawhide sheet 12 is preferably sufficient for the rawhide sheet 12 to be rolled over itself between 1½ and 2 times. The thickness of the rawhide sheet 12 may vary as a function of the length of the chew toy to provide it with sufficient structural stability and stiffness. In a preferred embodiment, the thickness of the rawhide sheet is approximately ⅛ inch. Nevertheless, the length, width, and thickness of the rawhide can vary as desired to provide chew toys of different shapes, configurations, and stiffnesses.

The preferred rawhide is a standard international grade, of either cow or buffalo origin. As is generally well known in the art, rawhide can first be processed through a de-hairing, soaking, and cleansing process. Furthermore, whole hides or splits can be further processed and cleansed in a solution which can include hydrogen peroxide and various other cleansing and/or bleaching agents. This process makes the material sufficiently malleable to manipulate as desired, e.g. folded, rolled, braided, and/or knotted. This process also results in making the material suitable for consumption by pets. Each rawhide piece is laid out and one or more pieces of pigskin are placed on the rawhide piece in a layered fashion. Alternatively, a reverse application in which the rawhide is placed on the pigskin can also be utilized to locate the more flavorful pigskin along the exterior of the chew toy.

The preferred pigskin is a standard international grade of pig hide otherwise referred to as "skin." Pigskin can first be processed through a scalding de-hairing process followed by a soaking and cleansing process. Whole hides or splits can be further processed and cleansed in a solution that can include hydrogen peroxide and various other cleansing and/or bleaching agents. This process makes the material sufficiently malleable to manipulate as desired.

While in the malleable condition, the pigskin and rawhide sheets 12, 14 are rolled or folded into the cylinder shown in FIGS. 1 and 3, and knotted, if desired, manually or mechanically. The pigskin and rawhide sheets 52, 54 can also be folded, either manually or mechanically, to provide the chew toy 50 shown in FIG. 4. The chew toy is then dried thoroughly in a conventional manner, such as sun drying or oven drying, during which the chew toy will become rigid and will maintain its rolled or folded shape. The chew toy will then be ready for packaging and distribution.

The pigskin sheets provide a chew toy which has enhanced flavor and odor compared to a rawhide chew toy, thereby encouraging chewing of the chew toy. The use of pigskin rather than a meat-based product provides a chew toy having a flavor-enhanced component which is less expensive than a meat-based product, and is less costly to produce. Furthermore, pigskin has a durability closely approximating that of rawhide, thereby providing a useful life generally equivalent to that of a chew toy comprising rawhide alone. Still further, the pigskin sheets provide significantly less calories, especially fat calories, than the meat/rawhide chew toys.

While the invention has been specifically described in connection with certain specific embodiments thereof, it is to be understood that this is by way of illustration and not of limitation. Reasonable variation and modification are possible within the scope of the forgoing description and drawings without departing from the spirit of the invention, which is described in the appended claims.

What is claimed is:

1. A chew toy for carnivorous domestic animals comprising:
   a sheet of rawhide; and
   a sheet of pigskin;
   wherein the pigskin and the rawhide are interlayered with each other to form a composite unit.

2. A chew toy according to claim 1 wherein the pigskin and rawhide sheets are substantially coextensive with each other in at least one dimension and are wrapped into a substantially cylindrical shape.

3. A chew toy according to claim 2 wherein the cylindrical shape is knotted at the ends thereof.

4. A chew toy according to claim 2 wherein the rawhide sheet forms an outer layer in the cylindrical shape.

5. A chew toy according to claim 4 wherein the pigskin is exposed at a longitudinal seam of the rawhide sheet.

6. A chew toy according to claim 5 wherein the pigskin is continuously exposed along the longitudinal seam of the rawhide sheet.

7. A chew toy according to claim 6 wherein the pigskin sheet is substantially coextensive with the rawhide sheet in two mutually perpendicular directions.

8. A chew toy according to claim 6 wherein there are multiple pigskin sheets that are in the form of elongated strips that are laterally spaced from each other between portions of the rawhide sheet.

9. A chew toy according to claim 5 wherein there are multiple pigskin sheets that are in the form of elongated strips that are laterally spaced from each other between portions of the rawhide sheet and the pigskin sheets are intermittently exposed along the longitudinal seam of the rawhide.

10. A chew toy according to claim 2 wherein the pigskin sheet forms an outer layer in the cylindrical shape.

11. A chew toy according to claim 2 wherein there are multiple layers of at least one of the rawhide and the pigskin sheets.

12. A chew toy according to claim 1 wherein there are multiple layers of at least one of the rawhide and the pigskin sheets.

13. A chew toy according to claim 1 wherein the rawhide sheet is wrapped around the pigskin sheet.

14. A chew toy according to claim 1 consisting essentially of the rawhide sheet and the pigskin sheet.

15. A chew-resistant article according to claim 1 consisting essentially of the rawhide piece and the pigskin piece.

16. A chew-resistant article for carnivorous domestic animals comprising:
   a chew-resistant piece of rawhide wrapped around a chew-resistant piece of pigskin to form a composite shape, wherein the chew resistant rawhide provides significant chew resistance for the article and the pigskin provides a chew-resistant enduring flavor attractant for the animals.

17. A chew-resistant article according to claim 16 wherein the pigskin and rawhide pieces are substantially coextensive with each other in at least one dimension and are wrapped into a substantially cylindrical shape.

18. A chew-resistant article according to claim 17 wherein the cylindrical shape is knotted at the ends thereof.

19. A chew-resistant article according to claim 17 wherein the rawhide piece forms an outer layer in the cylindrical shape.

20. A chew-resistant article according to claim 19 wherein the pigskin piece is exposed at a longitudinal seam of the rawhide sheet.

21. A chew-resistant article according to claim 20 wherein the pigskin piece is continuously exposed along the longitudinal seam of the rawhide.

22. A chew-resistant article according to claim 21 wherein the pigskin piece is substantially coextensive with the rawhide in two mutually perpendicular directions.

23. A chew-resistant article according to claim 22 wherein there are multiple pigskin pieces that are arranged in the form of elongated strips that are laterally spaced from each other between layers of rawhide.

24. A chew-resistant article according to claim 20 wherein the pigskin is in the form of elongated strips that are laterally spaced from each other between layers of rawhide and the pigskin pieces are intermittently exposed along the longitudinal seam of the rawhide.

25. A chew-resistant article according to claim 17 wherein the pigskin piece forms an outer layer in the cylindrical shape.

26. A chew-resistant article according to claim 17 wherein there are multiple layers of at least one of the rawhide and the pigskin sheets.

27. A chew-resistant article according to claim 16 wherein there are multiple layers of at least one of the rawhide and the pigskin pieces.

28. A chew-resistant article according to claim 16 wherein the rawhide piece is wrapped around the pigskin piece.

* * * * *